United States Patent [19]

Rogers et al.

[11] 4,158,191
[45] Jun. 12, 1979

[54] AIR CUSHION ACTUATION AND MONITORING CIRCUIT

[75] Inventors: Wesley A. Rogers, Grosse Pointe Park; John T. Auman, Washington, both of Mich.

[73] Assignee: General Motors Corporation, Detroit, Mich.

[21] Appl. No.: 881,717

[22] Filed: Feb. 27, 1978

[51] Int. Cl.² ............ B60R 21/08; G08B 21/00
[52] U.S. Cl. .................. 340/52 H; 180/103 A; 280/735; 307/10 R
[58] Field of Search ............ 340/52 R, 52 H, 53; 180/91, 103 A, 104; 280/734, 735; 307/10 R

[56] References Cited

U.S. PATENT DOCUMENTS

| | | | |
|---|---|---|---|
| 3,601,655 | 8/1971 | Andersen | 340/52 H |
| 3,629,816 | 12/1971 | Gillund | 340/61 |
| 3,633,159 | 1/1972 | Dillman et al. | 340/52 R |
| 3,668,627 | 6/1972 | Brainerd | 340/52 H |
| 3,745,523 | 7/1973 | Lewis et al. | 340/52 R |
| 3,767,002 | 10/1973 | Gillund | 280/735 X |
| 4,086,562 | 4/1978 | Hasegawa | 340/52 H |

Primary Examiner—John W. Caldwell, Sr.
Assistant Examiner—Joseph E. Nowicki
Attorney, Agent, or Firm—Albert F. Duke

[57] ABSTRACT

A control and indicating circuit for an inflatable safety system in which oppositely poled diodes provide isolated firing and monitoring networks interconnected between single pole, double throw impact switches. In one embodiment the diode in the firing network is light activated.

4 Claims, 4 Drawing Figures

AIR CUSHION ACTUATION AND MONITORING CIRCUIT

This invention relates to circuitry for energizing the firing means of an inflatable safety system for vehicles and for providing an indication to the vehicle occupant of the readiness of the circuitry to perform its function in the event of a collision.

Prior art firing and monitoring circuits such as shown in U.S. Pat. Nos. 3,629,816; 3,633,159; and 3,668,627 pass a relatively small current through the squib at all times and monitor a voltage drop to detect malfunctions of the firing network. Changes in voltage at the monitoring junction as a result of resistance changes in the circuit may produce a malfunction indication when in fact there is no malfunction of the firing circuit.

With the foregoing in mind it is an object of the present invention to provide an improved firing and monitoring circuit for an inflatable safety system which permits the use of relatively large monitor current in order to improve the reliability of the malfunction indication.

It is another object of the present invention to provide such a circuit including light responsive means for activating the firing network.

In accordance with the present invention an impact sensor switch of a single pole, double throw configuration is connected on each side of the firing means and interconnected with the vehicle battery and steering diodes which provide a path for a monitoring current in parallel with the firing means when the switches are in a nonimpact state while providing a separate path through the firing means when the switches are in an impact state. In one embodiment, the firing network is optically enabled.

A more detailed understanding of the present invention may be had from the following detailed description which should be read in conjunction with the drawings, in which.

Figure 1:
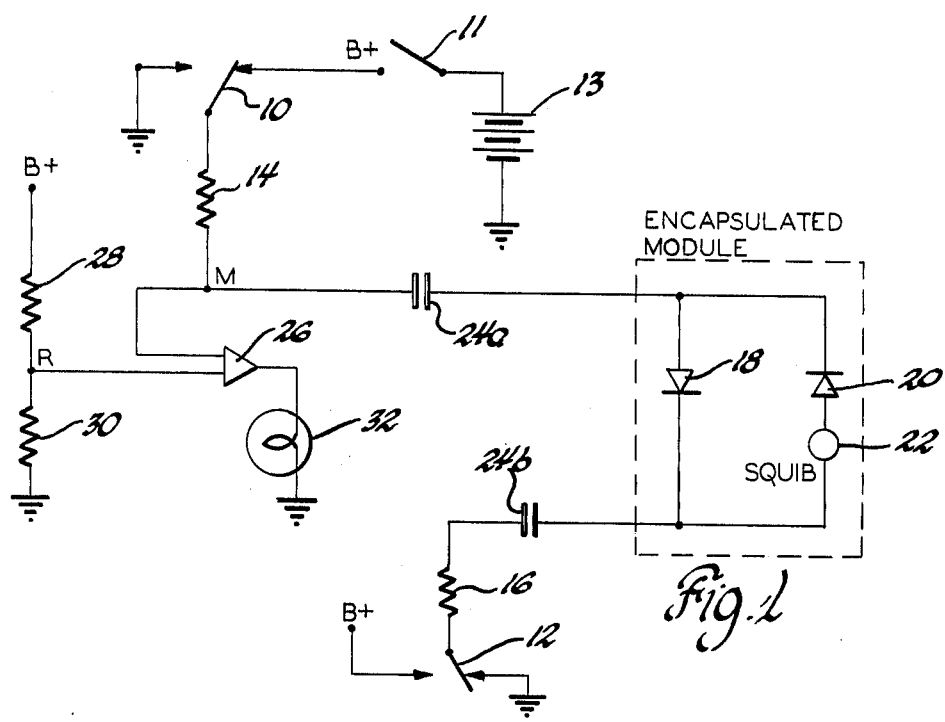
FIG. 1 is a schematic diagram of one embodiment of the firing and monitoring circuit of the present invention.

Referring now to the drawings and initially to FIG. 1, one embodiment of the circuit of the present invention includes impact sensor switches schematically represented as single pole, double throw switches 10 and 12. The switches 10 and 12 are acceleration responsive switches which close when the vehicle is subjected to acceleration of deceleration in excess of a predetermined magnitude and time duration such as would occur during a collision. The switch 10 has a normal position as shown in which it is connected through the ignition switch 11 to the positive terminal of the vehicle battery 13. The switch 12 is connected to ground potential in its normal position. The switches 10 and 12 are appropriately mounted on the vehicle and in the event of a collision move from the position shown to a position where the switch 12 is connected to B+ and the switch 10 is connected to ground. A series network comprising resistors 14 and 16 and the parallel combination of diodes 18 and 20 and a squib 22 is connected between the switches 10 and 12. The diodes 18 and 20 and squib 22 are preferably encapsulated to provide additional protection against open circuiting. As is well known in the art, the firing of the squib 22 by passage of a predetermined current therethrough may be utilized to rupture the diaphragm of a sealed pressure vessel thereby inflating an associated inflatable cushion. It is contemplated that the inflatable cushion will be mounted in the steering wheel of the vehicle and accordingly the diodes 18 and 20 and squib 22 are electrically connected with the switches 10 and 12 through a slip ring assembly schematically illustrated at 24a and 24b.

A voltage comparator 26 is provided for sensing the voltage at a monitoring junction M. The other input of the comparator 26 is connected to a voltage divider network comprising resistors 28 and 30 which establishes a reference voltage at the junction R. The output of the comparator 26 is connected with an indicator lamp 32. The voltage at the junction M is normally about one-half of the regulated battery voltage which is approximately the voltage established by the voltage divider resistors 28 and 30 at the junction R. A change in voltage at the junction M resulting from a short to ground or open circuit in the network between the switches 10 and 12 will unbalance the voltages at the junctions M and R sufficiently to switch the output of the comparator 26 and energize the lamps 32.

During normal operation the switches 10 and 12 are in the position shown so that current flows through the diode 18 while the diode 20 blocks any current flow through the squib 22. Since current does not pass through the squib 22, while the switches 10 and 12 are in their normal state as shown, a larger monitoring current than utilized in prior art monitoring schemes can be utilized. It is known that as the current through the slip rings 24a and 24b is increased the resistance drops to a low value. Changes in the values of the resistance due to aging and surrounding temperature and humidity conditions are minor and thus have little effect on the voltage at the junction M and consequently reduce the likelihood of an improper malfunction indication.

In the event of a collision, the switches 10 and 12 are moved to their opposite positions so that switch 12 is connected to B+ and switch 10 is connected to ground. Under these circumstances the diode 18 is reverse biased and the diode 20 conducts to fire the squib 22.

Figure 2:
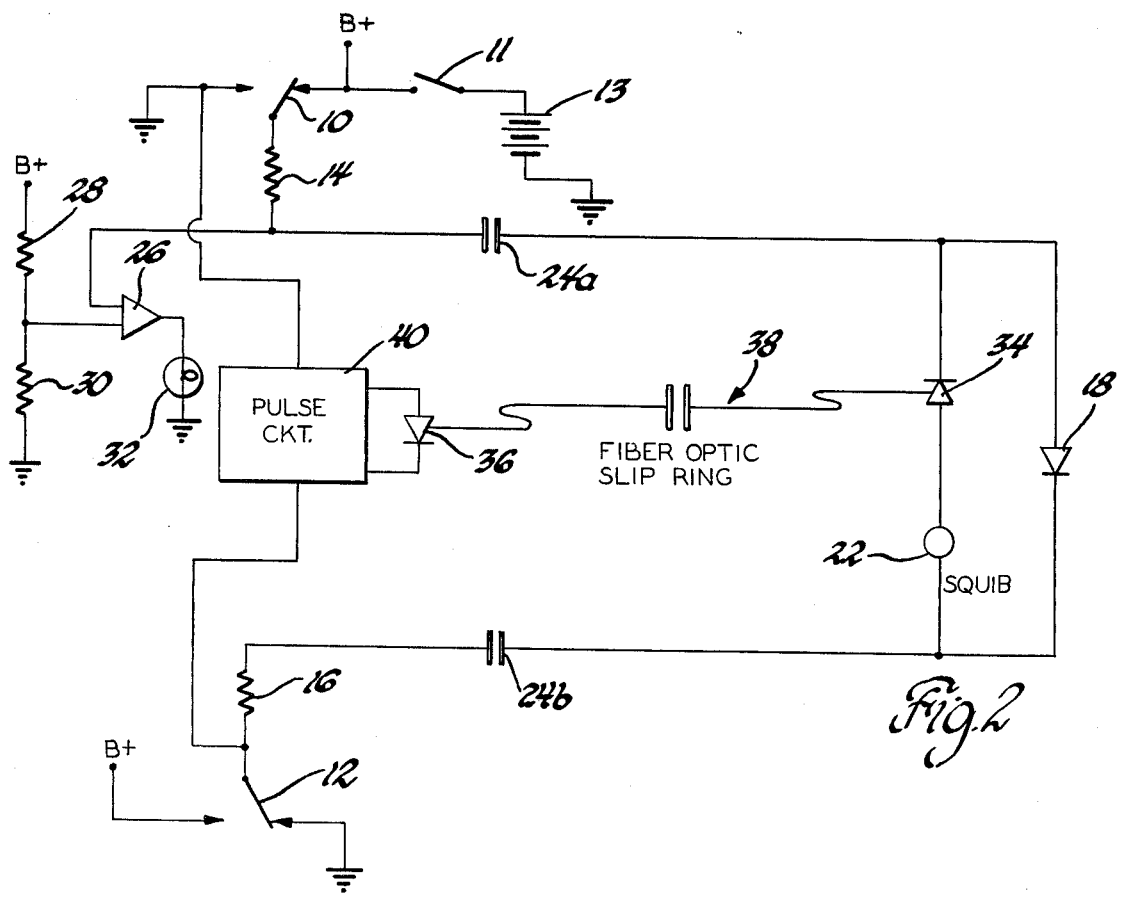
FIG. 2 is a schematic diagram of another embodiment of the present invention.

Referring now to FIG. 2, the diode 20 is replaced by a light activated silicon control switch 34. The switch 34 is latched to a conductive state by energization of a light emitting diode 36 which transmits light to the switch 34 through an optical slip ring assembly generally designated 38. The light emitting diode 36 is preferably pulsed from a pulse generating circuit 40, such as a multivibrator, which is normally deenergized when the switches 10 and 12 are in the position shown but is energized when the switches are moved to the state occupied in the event of a collision.

Figure 3:
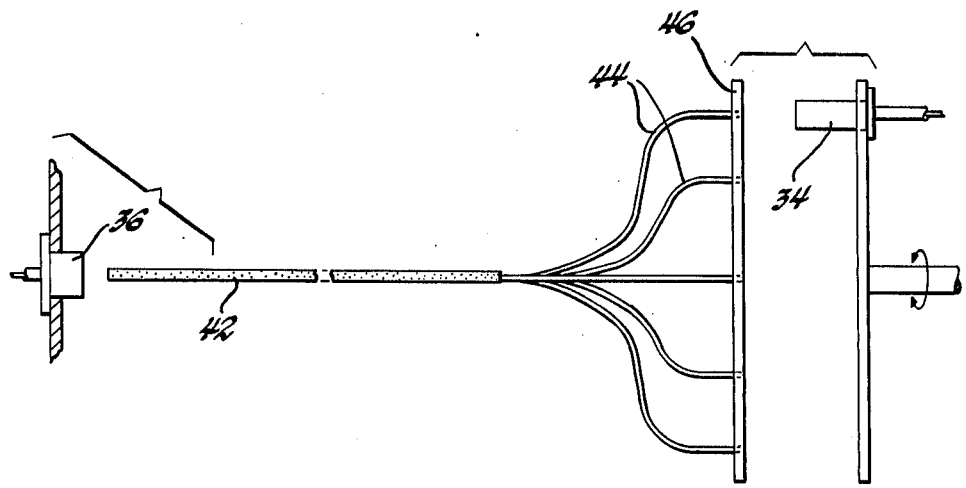
FIG. 3 shows one configuration of the optical slip ring used in the circuit of FIG. 2.

Referring now to FIG. 3, the slip ring configuration used in FIG. 2 is disclosed in greater detail. The fiber optic cable 42 includes a plurality of strands 44 which are received in openings around the periphery of a stationary ring 46 to produce a continuous ring of light. The light activated switch 34 which rotates with the steering wheel is therefore capable of being activated from any location around the periphery of the ring 46.

Figure 4:
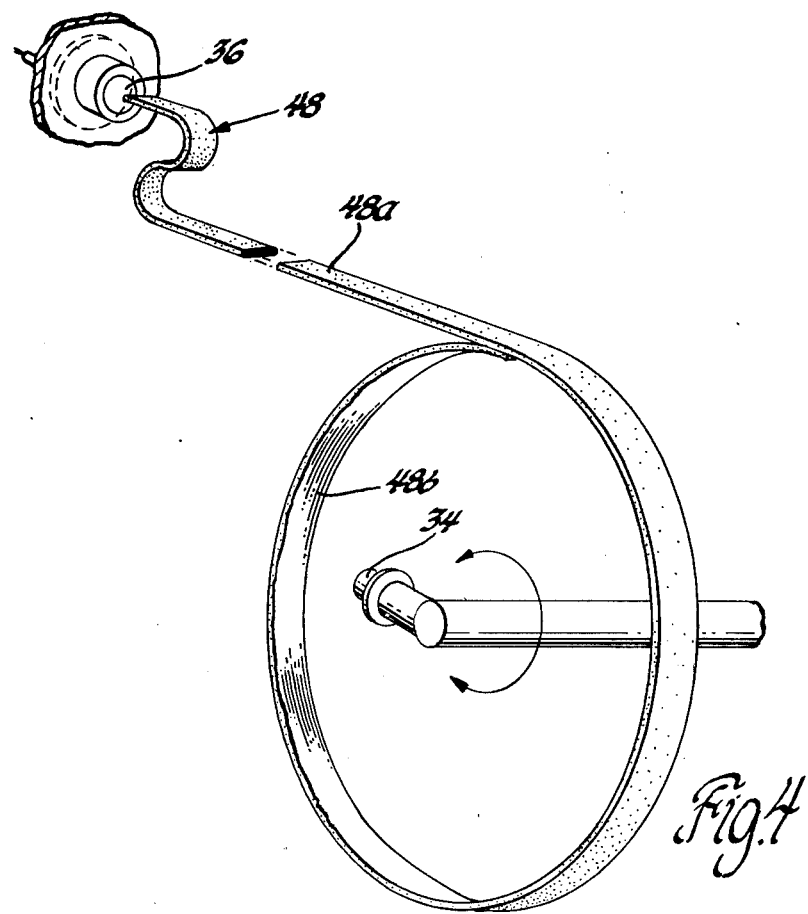
FIG. 4 shows another configuration of the optical slip ring used in the embodiment of FIG. 2.

Another optical slip ring configuration is shown in FIG. 4. In this configuration a flat ribbon fiber optic cable 48 is employed. The cable 48 has a reflective coating over the entire surface on one side thereof. The reflective coating is also provided on the other side of the generally noncircular portion designated 48a while a circular portion 48b transmits light from the stationary light source 36 to the rotating diode 34. The diode 34 may thus be activated in any position.

Having thus described our invention what we claim is:

1. A control and indicating circuit for energizing the firing means of an inflatable safety system for a vehicle comprising; a source of direct current potential, first and second impact sensor switch means disposed on said vehicle and having a normal state wherein said first switch means is connected to one terminal of said source and said second switch means is connected to ground potential, said first and second switch means being movable to a second state in the event of an impact wherein said first switch means is connected to ground potential and said second switch means is connected to said one terminal of said source, a first uni-directional conducting device connected in series with said firing means between said first and said second switch means, said first uni-directional conducting device preventing current flow through said firing means when said first and second switch means are in said normal state and permiting current flow through said firing means when said first and second switch means are in said second state, a second uni-directional conducting device oppositely poled to said first uni-directional conducting device and connected in parallel with said first uni-directional conducting device and said firing means, first and second resistor means connected in series between said second uni-directional conducting device and said first and second impact sensor switch means respectively, and monitoring means for sensing a change in the voltage at the junction between one of said resistor means and said second uni-directional conducting device.

2. The circuit defined in claim 1 wherein said monitoring means includes voltage comparator means having one input connected to said junction, voltage divider means providing a reference voltage at a second input of said comparator means and indicator means connected with the output of said comparator means.

3. A control and indicating circuit for energizing the firing means of an inflatable safety system for a vehicle comprising: a source of direct current potential, first and second impact sensor switch means disposed on said vehicle having a normal state wherein said first switch means is connected to one terminal of said source and said second switch means is connected to ground potential, said first and second switch means being movable to a second state in the event of impact wherein said first switch means is connected to ground potential and said second switch means is connected to said one terminal of said source, a first uni-directional conducting device connected in series with said firing means between said first and said second switch means, said first uni-directional conducting device being a light sensitive control rectifier preventing current flow through said firing means when said first and second switch means are in said normal state, a second uni-directional conducting device oppositely poled to said first uni-directional conducting device and connected in parallel with said first uni-directional conducting device and said firing means, first and second resistor means connected in series between said second uni-directional conducting device and said first and second impact sensor switch means respectively, means responsive to movement of said switch means to said second state for generating pulses of light, means for communicating said light pulses to said control rectifier to render the same conductive to thereby permit current flow through said firing means when said first and second switch means are in said second state, and monitoring means for sensing a change in voltage at the junction between one of said resistor means and said second uni-directional conducting device.

4. The circuit defined in claim 3 wherein said monitoring means includes voltage comparator means having one input connected to said junction, voltage divider means providing a reference voltage at a second input of said comparator means and indicator means connected with the output of said comparator means.

* * * * *